Figure 1:
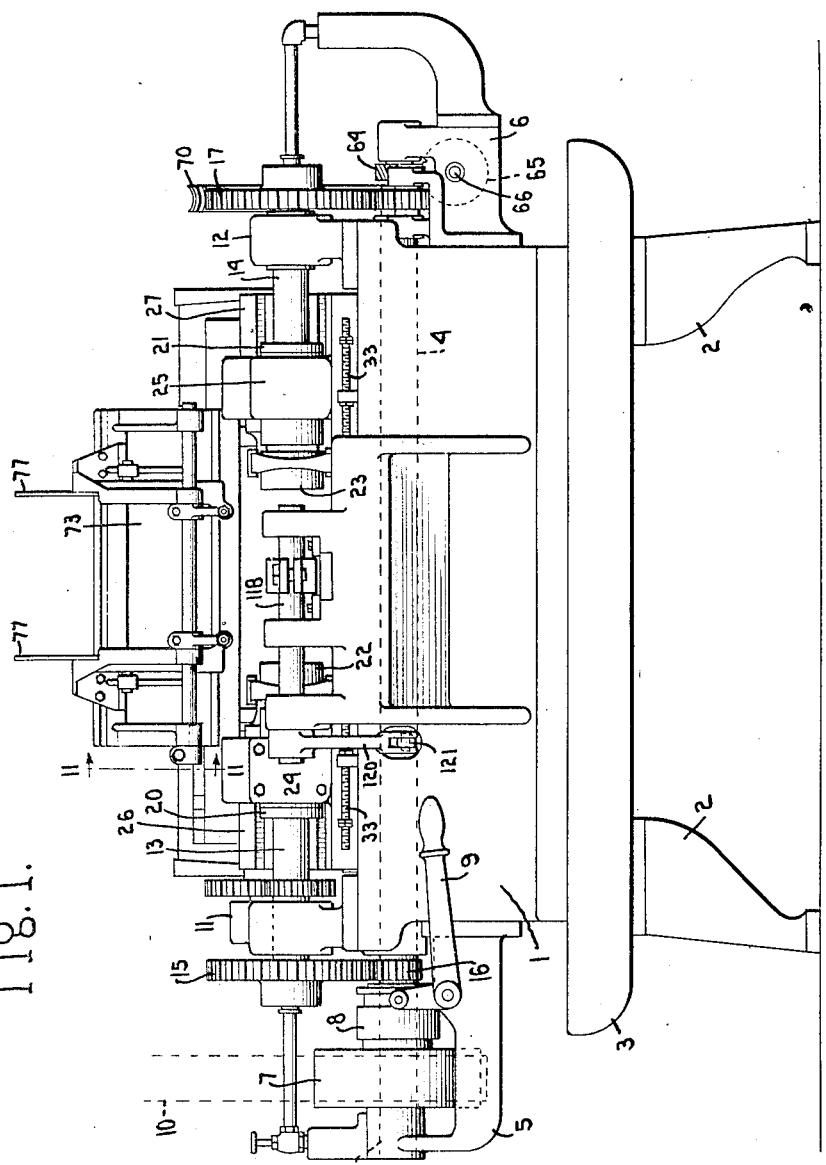

April 17, 1928.

J. P. BROPHY 1,666,732

AUTOMATIC STAYBOLT THREADING MACHINE

Filed Feb. 8, 1923   15 Sheets-Sheet 3

John P. Brophy
INVENTOR.

BY
Fay Oberlin & Fay
ATTORNEYS

April 17, 1928.

J. P. BROPHY 1,666,732

AUTOMATIC STAYBOLT THREADING MACHINE

Filed Feb. 8, 1923 15 Sheets-Sheet 4

John P. Brophy
INVENTOR.

BY
Fay Oberlin & Fay
ATTORNEYS

April 17, 1928. 1,666,732
J. P. BROPHY
AUTOMATIC STAYBOLT THREADING MACHINE
Filed Feb. 8, 1923 15 Sheets-Sheet 5

John P. Brophy
INVENTOR.

BY
Fay Oberlin & Fay
ATTORNEYS

April 17, 1928.

J. P. BROPHY 1,666,732

AUTOMATIC STAYBOLT THREADING MACHINE

Filed Feb. 8, 1923

15 Sheets-Sheet 6

John P. Brophy

INVENTOR.

BY

ATTORNEYS

April 17, 1928.　　　　　　　　　　　　　　　　　　　　1,666,732
J. P. BROPHY
AUTOMATIC STAYBOLT THREADING MACHINE
Filed Feb. 8, 1923　　　　15 Sheets-Sheet 7

John P. Brophy
INVENTOR.

BY
Fay, Oberlin & Fay
ATTORNEYS

April 17, 1928. 1,666,732
J. P. BROPHY
AUTOMATIC STAYBOLT THREADING MACHINE
Filed Feb. 8, 1923 15 Sheets-Sheet 8
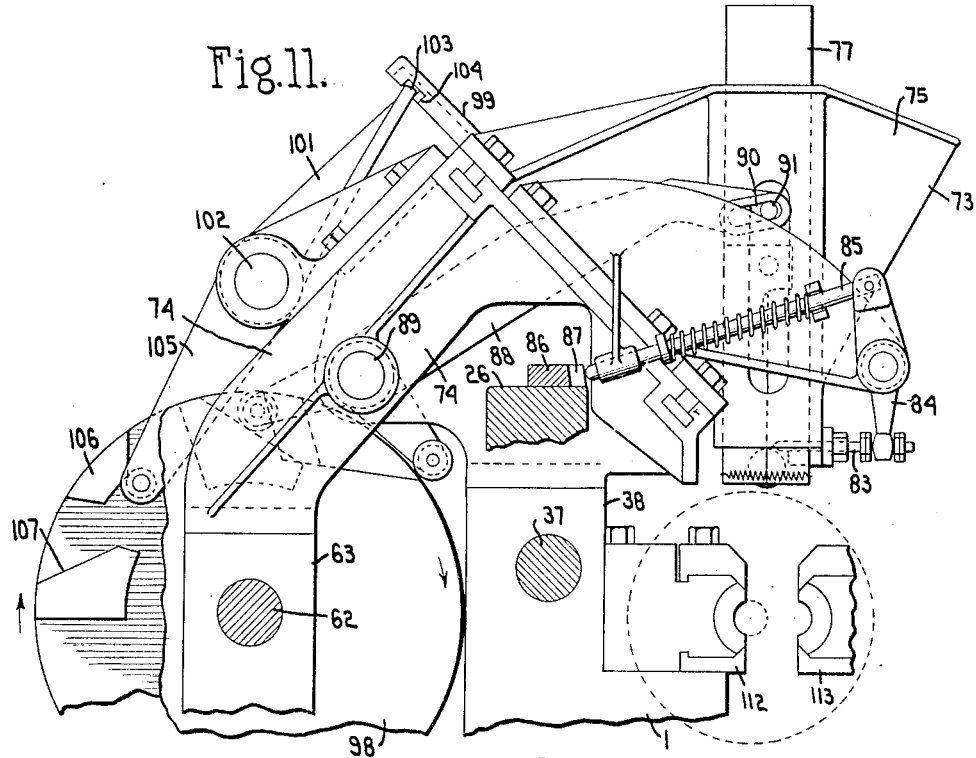
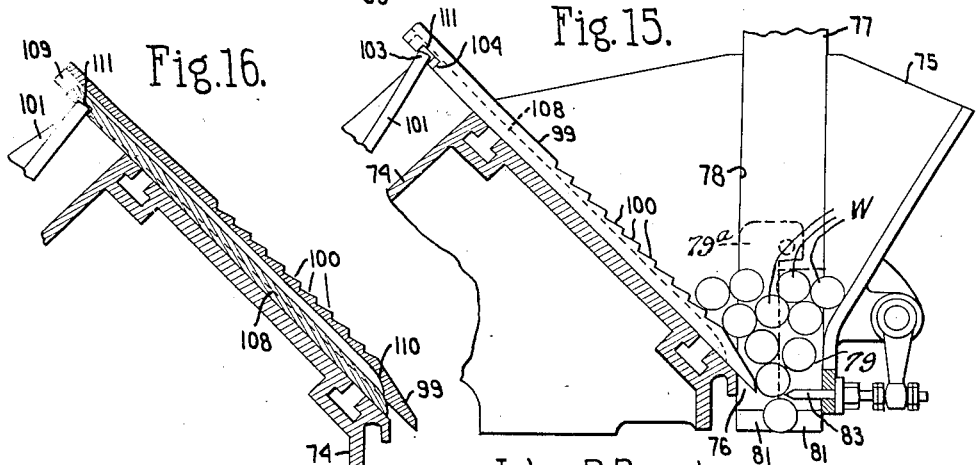
John P. Brophy
INVENTOR.
BY
Fay, Oberlin & Fay
ATTORNEYS

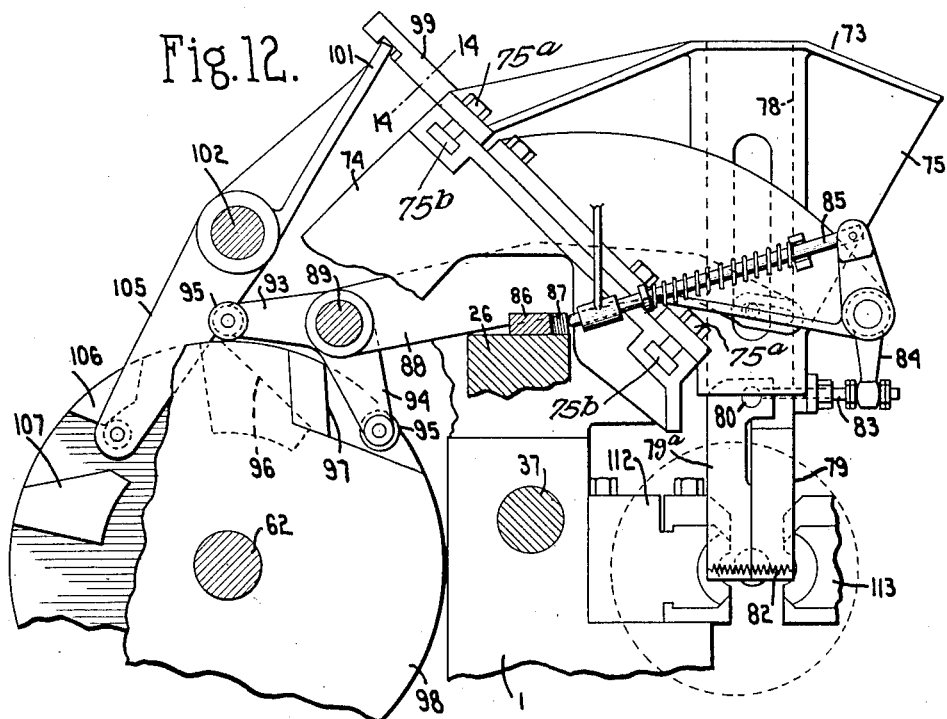
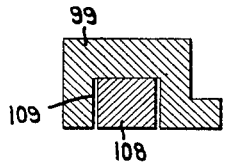
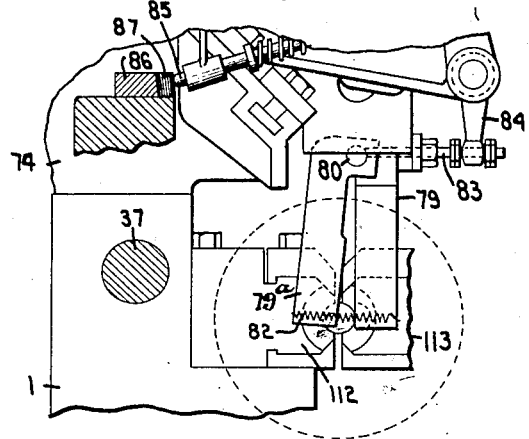
John P. Brophy, INVENTOR.

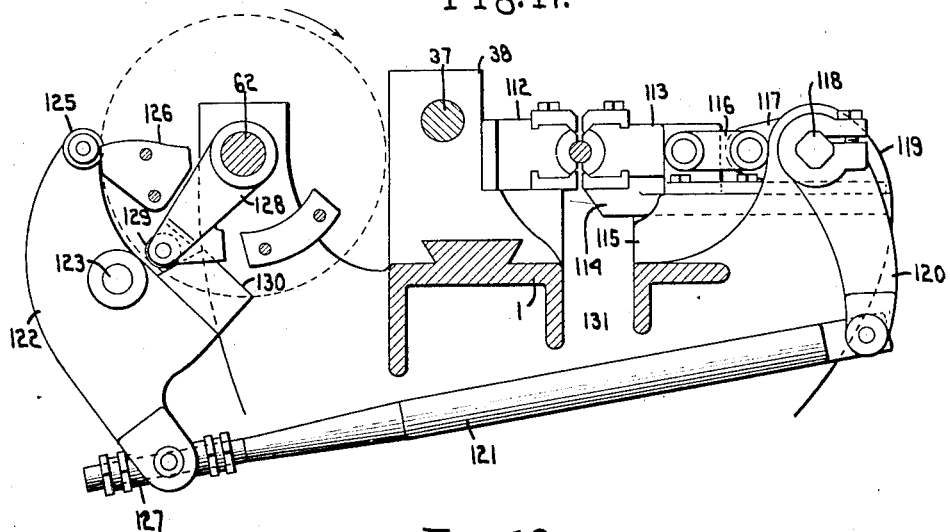
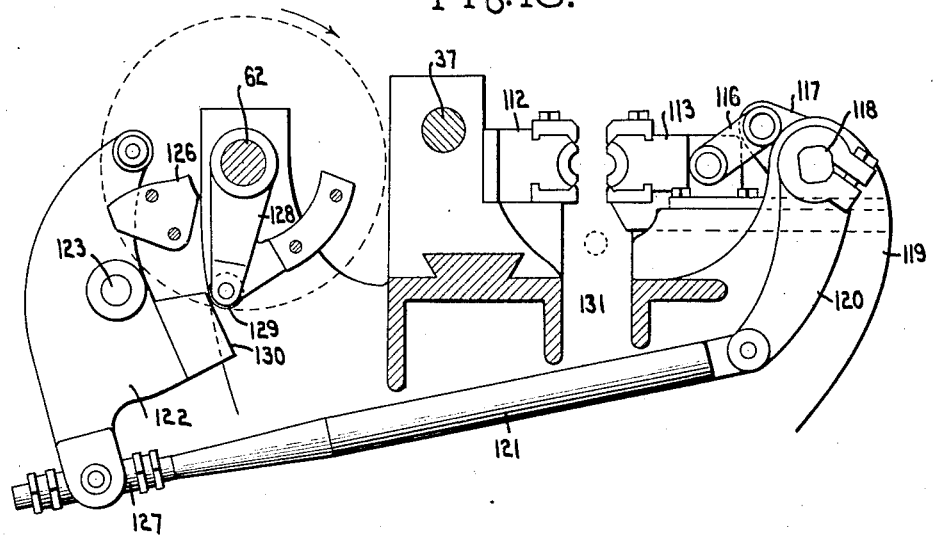

April 17, 1928. 1,666,732
J. P. BROPHY
AUTOMATIC STAYBOLT THREADING MACHINE
Filed Feb. 8, 1923 15 Sheets-Sheet 11
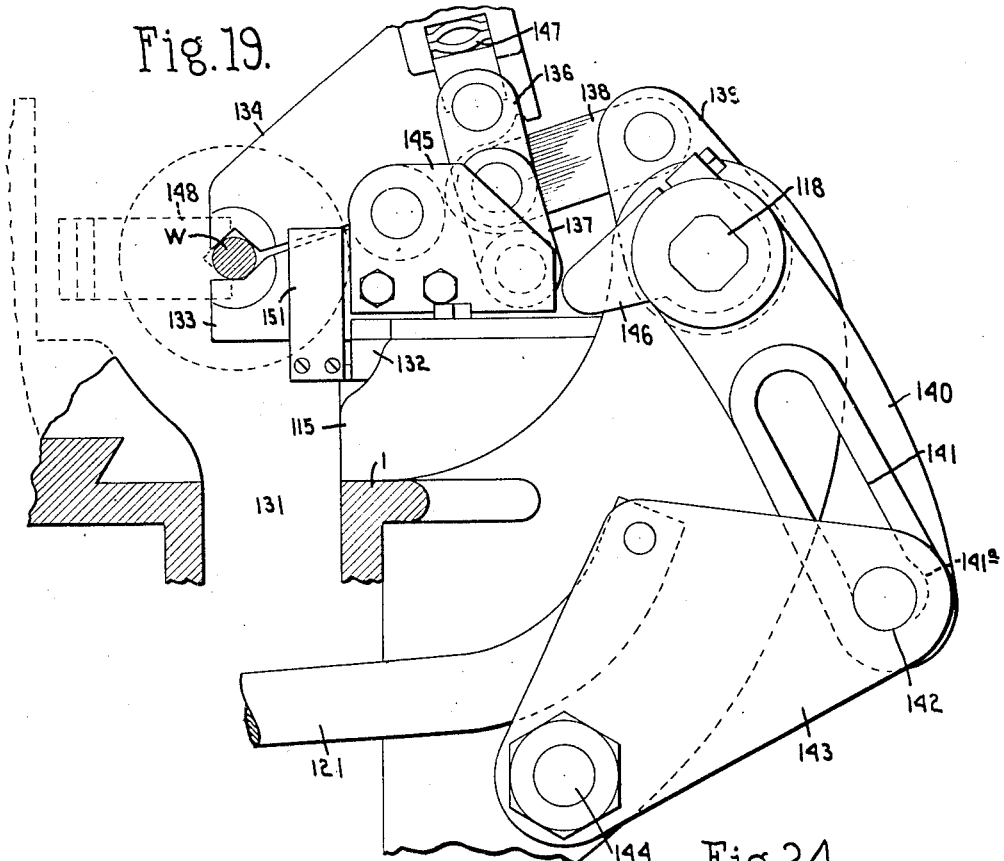
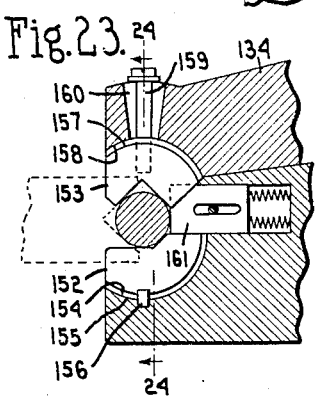
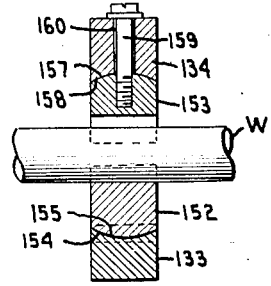
John P. Brophy INVENTOR.
BY
Fay, Oberlin & Fay ATTORNEYS

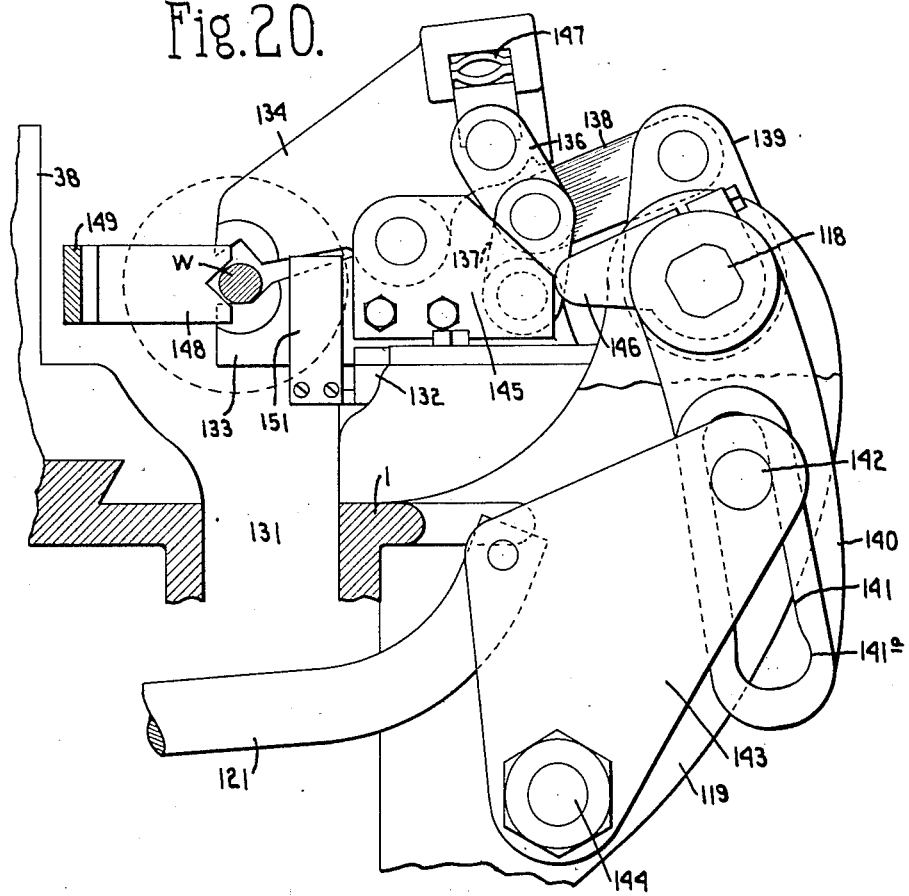

April 17, 1928.

J. P. BROPHY 1,666,732

AUTOMATIC STAYBOLT THREADING MACHINE

Filed Feb. 8, 1923    15 Sheets-Sheet 13

John P. Brophy
INVENTOR.

BY

Fay, Oberlin & Fay
ATTORNEYS

April 17, 1928.

J. P. BROPHY 1,666,732

AUTOMATIC STAYBOLT THREADING MACHINE

Filed Feb. 8, 1923      15 Sheets-Sheet 14

John P. Brophy
INVENTOR.

BY

Fay, Oberlin & Fay
ATTORNEYS

Patented Apr. 17, 1928.

1,666,732

UNITED STATES PATENT OFFICE.

JOHN P. BROPHY, OF CLEVELAND HEIGHTS, OHIO, ASSIGNOR TO THE CLEVELAND AUTOMATIC MACHINE COMPANY, OF CLEVELAND, OHIO, A CORPORATION OF OHIO.

AUTOMATIC STAYBOLT THREADING MACHINE.

Application filed February 8, 1923. Serial No. 617,721.

This invention relates to automatic machines and has for its general object the provision of a novel machine which will automatically cut or thread both ends of "staybolts" or the like simultaneously. In securing this I have aimed to provide in such a machine a construction which will be simple and expeditious in operation and which will perform all of its several functions automatically and continuously on any number of blanks supplied to the magazine of the machine.

My invention comprises thread cutting mechanism including revoluble automatic opening and closing dies which co-operate simultaneously to cut threads on each end of the stay-bolts, and blank holding means in the form of a magazine constructed to automatically feed blanks to a position in coaxial alignment with the threading dies. The thread cutting mechanism is constructed so that the revoluble dies are advanced upon the blanks the desired distance and then returned to their initial position ready for operation on the succeeeding blanks. The magazine for holding blanks is so constructed as to automatically feed the blanks one by one to operative position between the threading dies during each interval when such dies are being retracted.

An object of this invention resides in the provision of means for rigidly holding the blanks during the threading operation. Said means may consist of automatically operated jaws adapted to receive the blanks from the magazine and to hold such blanks against rotation when acted upon by the threading dies. In the novel construction provided by this invention, the blank holding jaws are operated intermittently with the threading operation.

The present machine is particularly adaptable for use in threading stay-bolts in the condition in which they are received from the rolling mill. In the final stages in the manufacture of stay-bolts they are finished to size by a rolling process; there being two of such processes, as is well known, namely cold-rolling and hot-rolling. Bolts produced by the cold-rolling process are perfectly straight and may be gripped in rigidly supported jaws prior to and during the threading operation; but bolts produced by the hot-rolling method are not so accurately straight, the shape thereof often being considerably distorted and if gripped rigidly intermediate their ends said ends would not be in alignment with the gripping means or with each other. Consequently such bolts cannot be gripped by rigidly supported jaws with any degree of safety to the machine or to the production of an evenly threaded bolt. One of the prime objects of this invention is to provide novel means which will grip and position a hot-rolled stay-bolt with both ends aligned for threading regardless of the distortion common in such bolts. The said gripping means for hot rolled bolts essentially consist of gripping jaws which are yieldingly supported so that they may automatically adjust themselves with respect to the shape or position of the stay-bolts. Another object hereof consists of means located adjacent the rotating dies and co-operating with the gripping jaws for coaxially aligning the ends of the bolts with the dies prior to the gripping action of the jaws.

One particular use for stay-bolts is in the construction of boilers having spaced walls or plates. These plates are provided with aligned screw threaded apertures in which are received stay-bolts which extend between the plates and hold them in spaced relation. Due to the inaccessibility to the interior of boilers and between the plates thereof, the aligned apertures are threaded by a long tap, which operation causes the threads in each of the said aligned apertures to be in lead with each other. Therefore it is necessary to cut the threads on each end of the stay-bolts in lead, and to the accomplishment of such end the present machine comprises novel means which advances the thread cutting dies in lead with each other and at the same rate of speed.

The above and other objects will more fully appear from the following description and accompanying drawings and will be especially pointed out in the appended claims.

Figure 2:
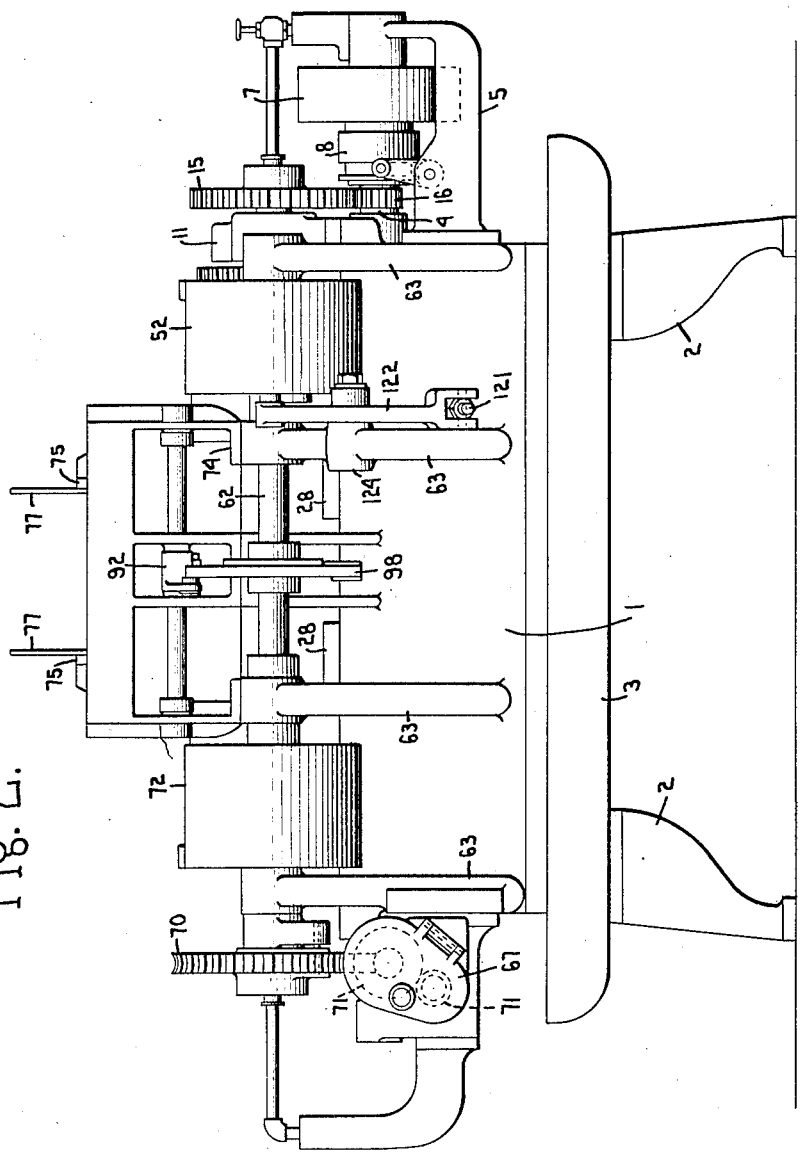
Figure 3:
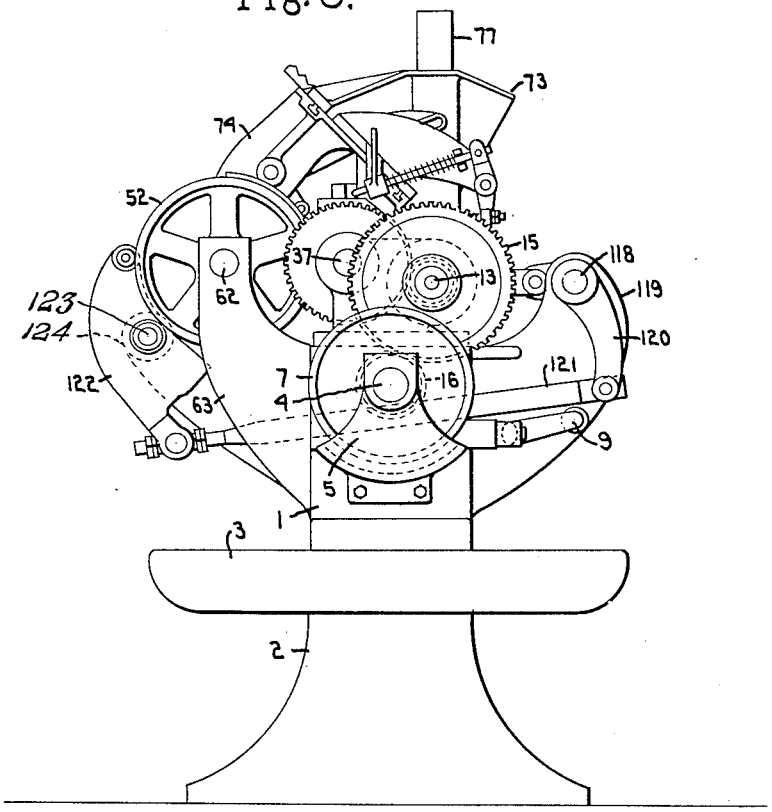
Figure 10:
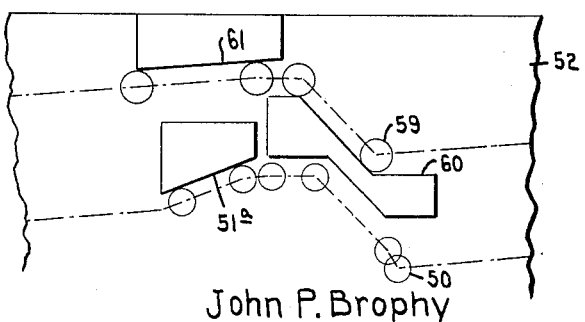
Figure 4:
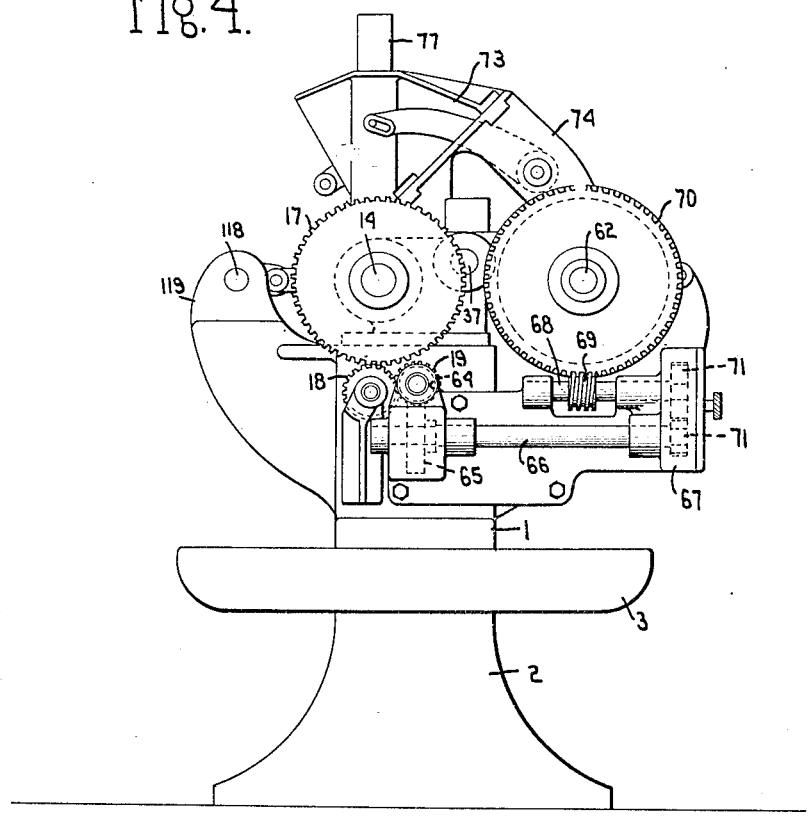
Figure 5:
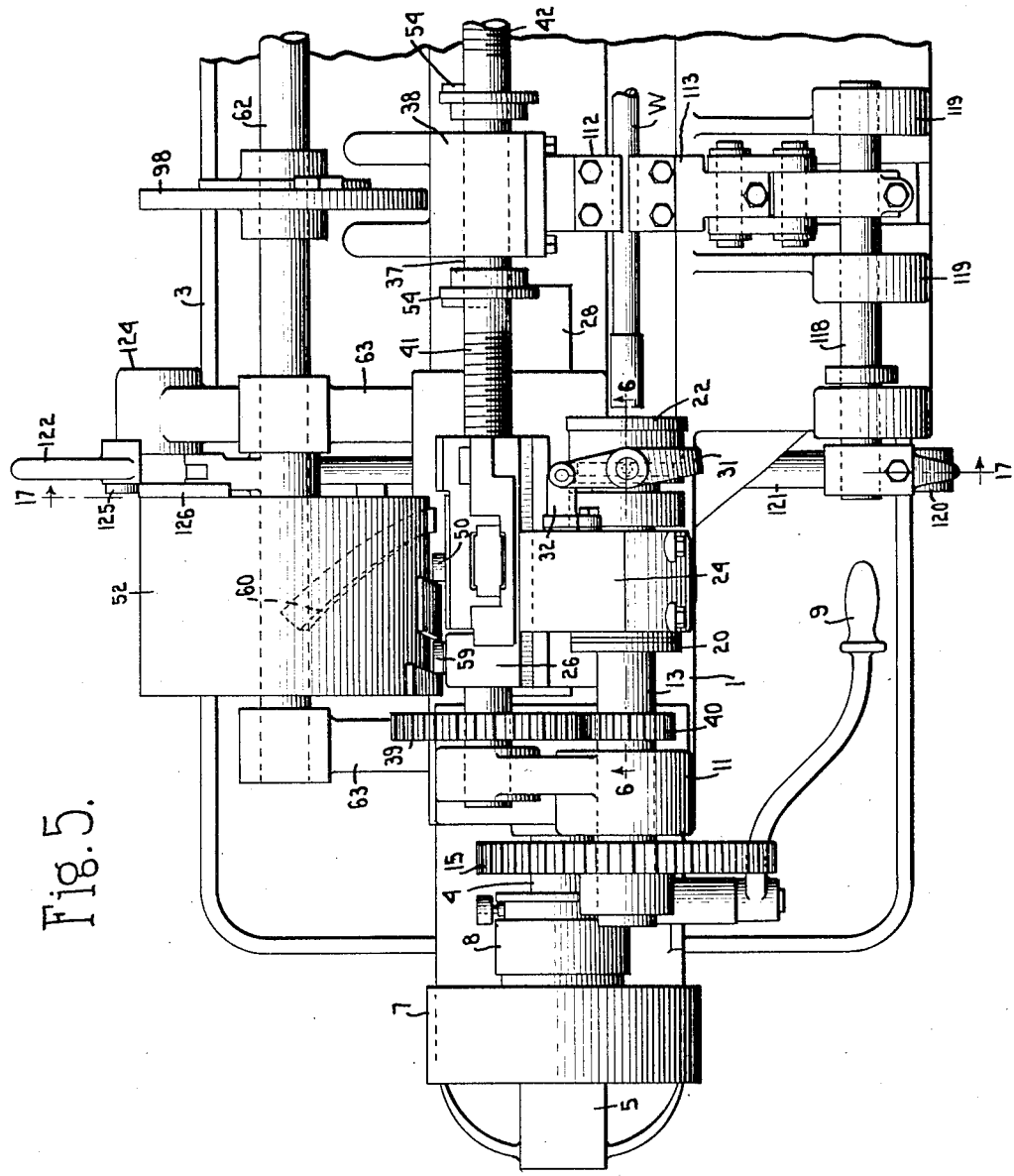
Figure 6:
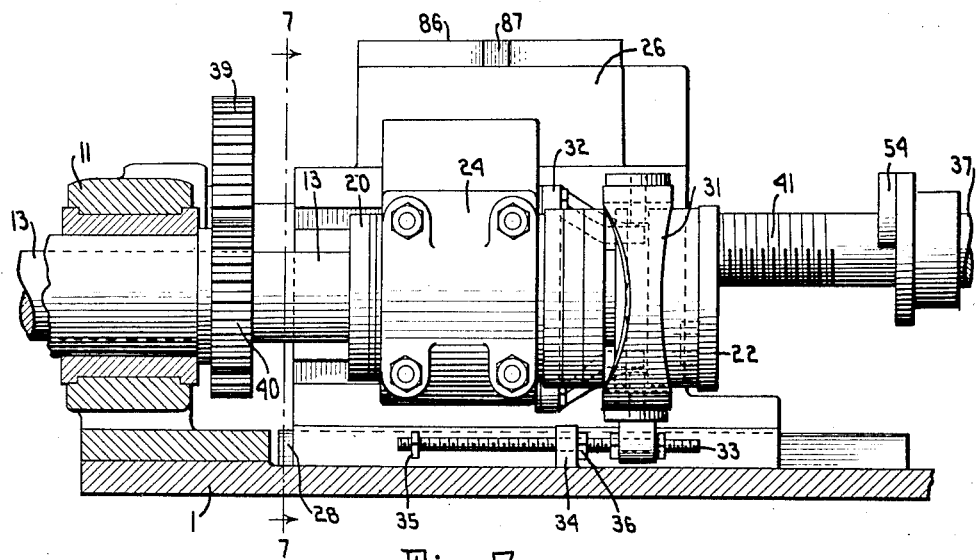
Figure 7:
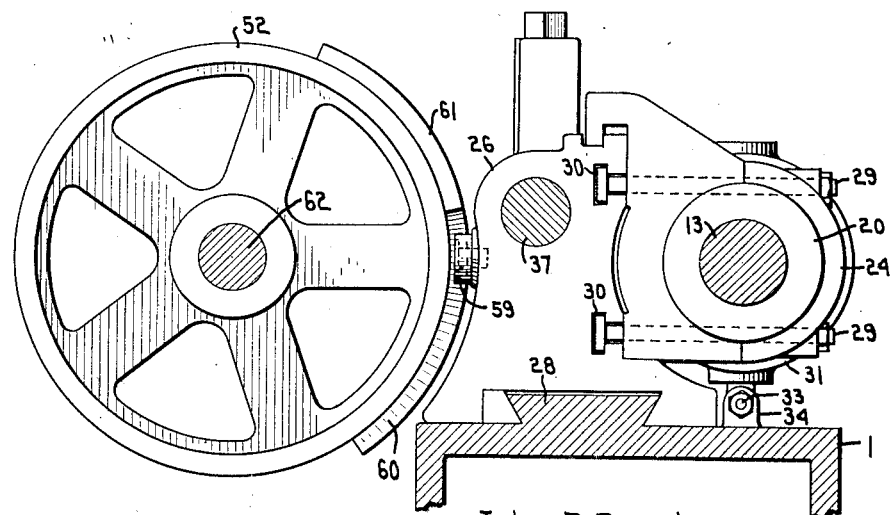
Figure 8:
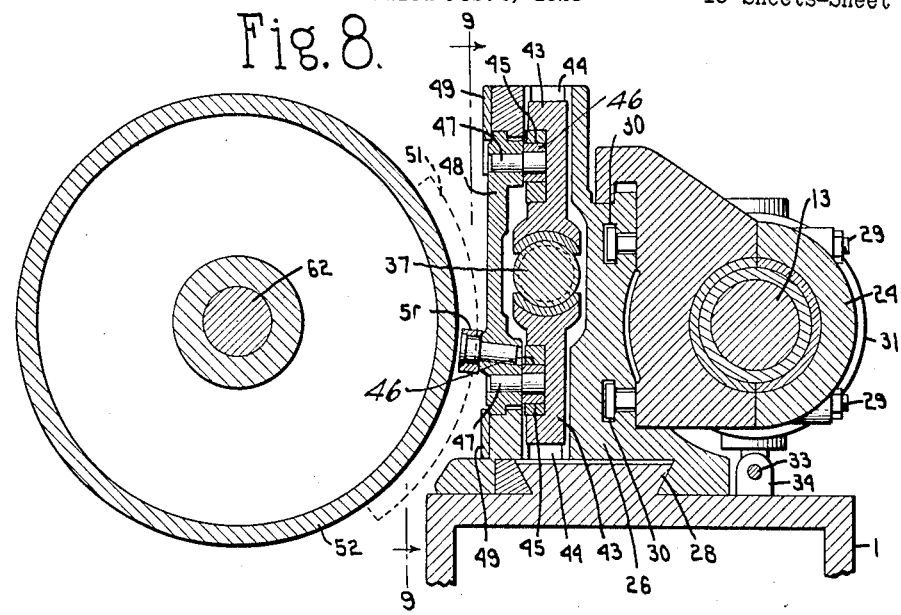
Figure 9:
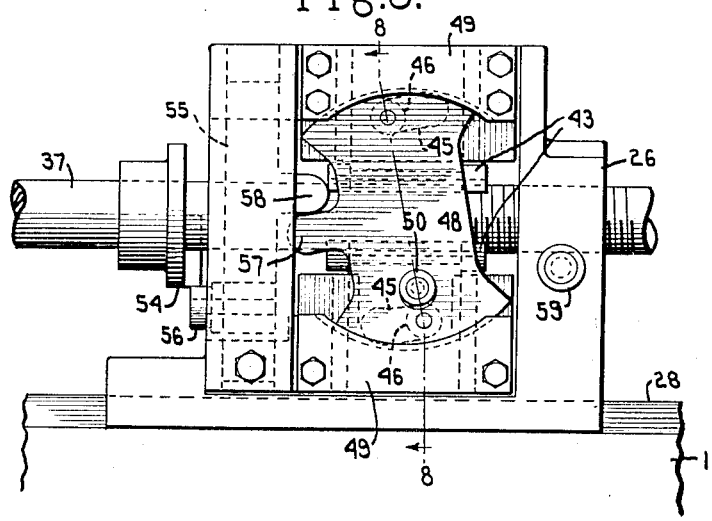
Figure 21:
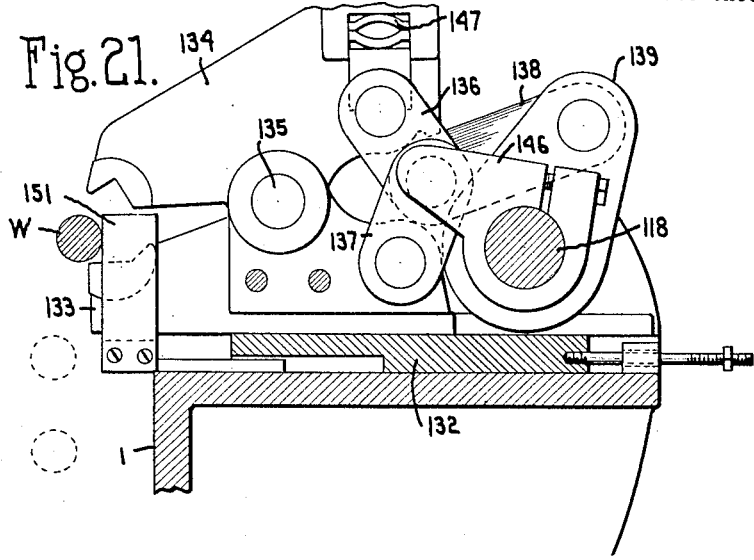
Figure 22:
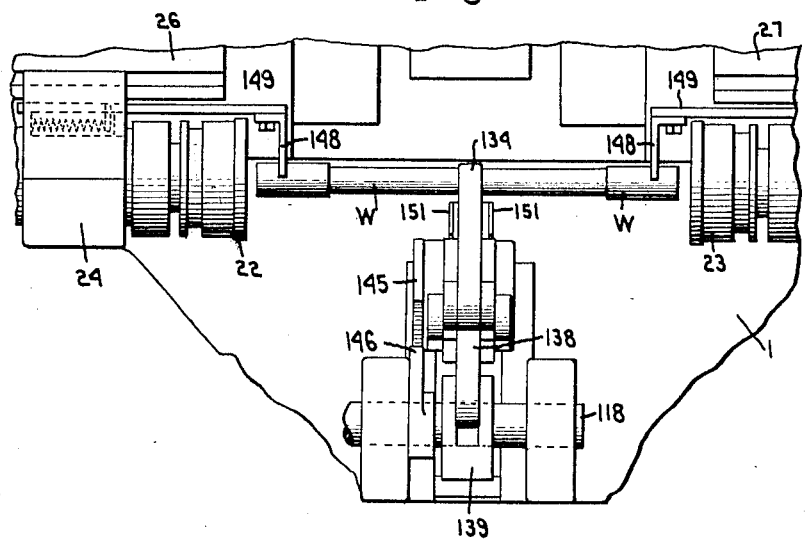

In the drawings:

Fig. 1 is a front elevation of a preferred form of machine for threading stay-bolts embodying my invention; Fig. 2 a rear elevation thereof; Fig. 3 an end elevation of the machine looking from the left in Fig. 1; Fig. 4 an end elevation looking from the right in Fig. 1; Fig. 5 a top plan view on an enlarged scale of one end of the machine; Fig. 6 a detailed view of one of the thread cutting dies and its support, taken on the line 6—6 in Fig. 5; Fig. 7 a sectional view taken on the line 7—7 in Fig. 6 (looking in the direction of the arrows); Fig. 8 a sectional view on the line 8—8 in Fig. 9 (looking in the direction of the arrows); Fig. 9 a rear elevation of one of the die carrying heads as seen from line 9—9 in Fig. 8; Fig. 10 a diagrammatic view illustrating the travel of the die carrying head and operating means therefor; Fig. 11 an enlarged sectional view on the line 11—11 in Fig. 1 showing in detail the magazine and its operative elements; Fig. 12 a similar view showing said elements in a different position; Fig. 13 a fragmentary view of the lower end of the magazine showing said elements in still another position; Fig. 14 a sectional view taken on the line 14—14 in Fig. 12; Fig. 15 a transverse sectional view through the magazine showing in elevation an agitator for agitating the bolts contained in the magazine; Fig. 16 a detailed sectional view taken through the agitator; Fig. 17 a transverse view through the machine on line 17—17 in Fig. 5 (looking in the direction of the arrows) showing in detail one form of blank gripping jaws and operating mechanism therefor; Fig. 18 a similar view showing the jaws open; Fig. 19 a view on an enlarged scale of a modified form of gripping jaws which are yieldingly supported, said figure showing the jaws as gripping a blank and holding it in coaxial alignment with the threading dies; Fig. 20 a similar view but showing the jaws starting to open; Fig. 21 a similar view but showing the jaws completely opened and the stay-bolt being ejected therefrom; Fig. 22 a partial top plan view of the thread cutting dies and gripping jaw mechanism; Fig. 23 a detailed sectional view through a modified form of self-adjusting gripping jaws; Fig. 24 a sectional view on the line 24—24 in Fig. 23; and Figs. 25 to 34, inclusive, are detailed outline views illustrating the operation of my novel machine in its various steps and in sequence of operation.

I have illustrated in the accompanying drawings a preferred embodiment of this invention which comprises a bed plate 1 supported on suitable standards or legs 2 and having a flanged pan 3 surrounding the base which serves in the usual manner to catch the oil used for lubricating the moving parts of the machine. The pan also serves to catch the finished product when ejected from the cutting dies as will be presently described. A main drive shaft 4 is suitably journaled in the bed plate and extends longitudinally therethrough. The ends of said drive shaft extend beyond the sides of the bed plate 1 and are additionally supported in brackets 5 and 6. Means for actuating the drive shaft comprises a pulley 7 loosely mounted thereon and a friction clutch 8 keyed thereto. A pivoted hand lever 9, conveniently located at the front of the machine, controls the engagement of the clutch with a complementary member carried by the pulley. The clutch referred to above is ordinary in construction, it being understood that various types of clutches might be used. Power may be transmitted to the pulley 7 in any desired manner, a driven belt 10 being shown herein for that purpose.

In the machine disclosed herein blanks are fed intermittently to a position coaxial with a pair of revolving thread cutting dies which are adapted to advance simultaneously upon both ends of the blank. The dies are then retracted and the cut blank released after which a new blank is fed in position and the threading operation repeated.

*The revolving dies and mechanism therefor.*

At each end of the bed plate 1 are mounted aligned brackets 11 and 12 in which are rotatably received spindle shafts 13 and 14 respectively, which shafts are coaxially aligned. Shaft 13 has secured to its outer end a gear 15 in mesh with a pinion 16 on the main drive shaft from which power is imparted to the spindle shaft. Likewise is the shaft 14 driven from shaft 4 through a gear 17, an idler gear 18 and a pinion 19. The purpose of the idler 18 is to cause shaft 14 to turn in reverse direction to the revolution of shaft 13, which purpose will be more clearly explained hereinafter.

The thread cutting dies and operating mechanism therefor oppositely located at each end of the machine and actuated from spindle shafts 13 and 14 are of identical construction but reversely arranged, as right and left hand members, and it is deemed necessary to describe in detail only one of such members. On the inner or adjacent ends of the spindle shafts are slidably mounted sleeves 20 and 21 which carry a pair of coaxially aligned thread cutting die heads 22 and 23. The sleeves may be keyed to the spindle shafts to provide driving engagement therewith. Supporting and controlling the longitudinal or sliding movement of said sleeves and dies are heads 24 and 25 which are mounted on reciprocable slide members 26 and 27. The members 26 and 27 are slidably mounted on top the bed plate 1 in dovetailed bosses 28 extending longitudinally of the machine and parallel with the spindle shafts. Head 24 is adjustably mounted on the member 26 as best seen in Figs. 5 to 8 and is adapted to be locked to said member by a number of T-head bolts 29 passing through the head 24 and slidably engaging slots 30 in member 26.

The reciprocable slide members 26 and 27 are actuated by suitable mechanism, as will appear in detailed description hereinafter, to travel toward and away from each other simultaneously and at the same rate of speed. The work or blanks, which are indicated in the drawings by the letter W, are adapted to be received substantially equidistant between and in coaxial alignment with the thread cutting dies, and it will be obvious that as the members 26 and 27 are moved toward each other the dies 22 and 23 will attack each end of the blanks and cut the threads thereon. As it is desired to have the threads on each end of a stay-bolt of the same character, i. e., either both right hand or left hand threads, I rotate the dies in reverse directions as has been heretofore explained. Such construction is not essentially restrictive to the scope of the invention, because if desired to cut threads of different lead on each end of a bolt, it is only necessary to eliminate the idler 18 and connect the gear 17 direct to pinion 19.

Preferably the thread cutting dies utilized on the present machine are of the well known automatic self-opening and closing type. In use with my novel machine the dies are caused to close prior to their advance upon the blanks and to open upon the completion of the threading operation so that they may be withdrawn from the blanks at a greater rate of speed than required in the threading movement. The control of such opening and closing of the dies may be effected in various ways. The means therefor herein shown comprises a yoke 31 partially surrounding the die 22 and adapted to move it longitudinally with respect to the sleeve 20, which movement causes the opening and closing of the die in the usual manner. The yoke 31 is pivotally carried by the head 24 on a laterally extending boss 32 and is consequently caused to travel with the die 22 and slide member 26. Secured to the lower side of the yoke and extending longitudinally of the die and spindle shaft is an adjustable rod 33 having sliding engagement in an enlarged aperture in a boss 34 on the top of the bed plate. On this rod at either side of the boss 34 are provided adjustable nuts 35 and 36 adapted to contact with said boss when the slide member 26 is moved in either direction and to cause the yoke 31 to swing about its pivot. Thus, in the forward movement of the dies the nut 35 engages boss 34 and causes the yoke to pivot and open the threading members of such die, and in the backward travel of said die, the nut 36 engages boss 34 and causes the yoke to pivot in the other direction which restores the threading member to operative position.

*The lead screw mechanism.*

As previously stated in the general statement of the objects of this invention at the beginning of the specification, one of the principal objects of the present invention is to provide in a machine of the character described means for positively threading both ends of a stay-bolt, or the like, simultaneously and to have such threads on each end of the bolt in lead with each other. Said means may consist of a revoluble shaft or lead screw 37 located parallel with the spindle shafts. The lead screw illustrated herein is suitably journaled at its ends in lateral extensions of the bosses 11 and 12 and may be additionally supported at its middle in an upstanding boss 38 provided on the bed plate 1 at the center thereof. Power is transmitted to said screw through a gear 39 carried thereon in mesh with the pinion 40 on the spindle shaft 13. Lead screw 37 is provided on each end with screw threads 41 and 42, the thread 41 being cut in the reverse direction to the thread 42. The respective ends of this lead screw are passed through each of the slide members 26 and 27 which are adapted to move longitudinally with respect to said screw.

Mounted in each of the slide members 26 and 27 are half nuts 43 which are provided with screw threads complemental to the threads 41 and 42. As best seen in Figs. 8 and 9 each of said slide members have a pair of such half nuts which are vertically, adjustably mounted, one on each side of the lead screw in suitable guideways 44. It will be obvious that by clamping the nuts 43 on the lead screw, the slide members and thread cutting dies will be caused to move longitudinally of the bed plate, and due to the reverse lead of the threads 41 and 42 the dies will be moved toward and away from each other in unison. Engaging in eccentric cam slots or grooves 45 provided in each the lower and upper halves of the vertically adjustable nuts are rolls 46 carried on pins 47 which are radially mounted in an oscillating plate or quadrant 48. Said quadrant is oscillatorily mounted in member 26 by plates 49 secured thereto. The quadrant 48 is preferably carried at the rear side of member 26 and has provided thereon a roller 50 which is adapted to be engaged by suitable cam 51$^a$ provided on a rotating cam drum 52 which will be hereinafter more fully described. As is apparent, oscillatory movement imparted to the quadrant 48 through the cam 51$^a$ and roller 50 will effect the vertical movement of the half nuts. In the present device, the cam 51$^a$ and roller 50 are only intended to close the half nuts on the lead screw although it is obvious that I might provide further extensions not shown, on the cam 51$^a$ to cause the roller to oscillate in the opposite direction to separate said nuts at the proper time. Upon being closed onto the lead screw the half nuts will actuate the slide member 26 to advance and the rotating die 22 to attack the blank. The other die 23 and its slide mechanism is similarly actuated. Means for opening the half nuts and preventing further movement of the dies upon the blanks after completion of their threading operation consists of an adjustable cam member 54 carried by the lead screw. Vertically, slidably mounted at the front end of the member 26 is a slide 55 which carries a roller 56 adapted to be engaged by the cam 54 when the slide member 26 has reached its desired furthermost position. On the rear side of the slide 55 and engaging a finger 57 on the quadrant 48 is a projection 58. Referring to Fig. 9, it will be seen that by moving the slide 55 downwardly as caused by the action of cam 54 the quadrant 48 will be rotated and the half nuts disengaged from the lead screw, thus stopping the advance movement of the thread cutting die 22. Also provided on the slide member 26 and extending rearwardly therefrom toward the cam drum 52 is a roller 59 adapted to have engagement with suitable cams 60 and 61 carried on said drum. The cam 60 is so designed and timed that it will engage roller 59 directly after the thread cutting operation has been completed to move the slide member 26 and the thread cutting dies, which have been by this time separated, back to their original position ready for the advance upon a new blank supplied to operative position. The purpose of providing the cam 60 on drum 52 is to provide means to move the slide 26 and the parts carried thereby back to starting position at a greater rate of speed than permitted in the advancing threading movement. Due to the apparent precariousness of attempting to engage a stationary nut with a revoluble screw, it is desired to provide means for causing the slide member 26 and the half nuts 43 to travel a slight distance with respect to the lead screw before effecting the engagement of said nuts with the screw. This initial travel is taken care of by cam 61 engaging roller 59 to advance the slide member at a rate of speed in conjunction with the lead of the screw 37 at which time the half nuts are engaged with the lead screw, as shown diagrammatically in Fig. 10. By providing the construction described immediately above, I eliminate any hazard to the mechanism which might occur from the attempt of locking a fixed nut on a revoluble shaft and insure the positive correct engagement of the nuts upon the lead screw. I have shown diagrammatically in Fig. 10 the correlation between the cams on drum 52 and the rolls 50 and 59 carried by the slide 26.

The cam shaft.

The cam drum 52, referred to above, is carried by a revolving shaft 62 which is mounted at the rear side of the machine in suitable brackets 63 provided on the bed plate. Shaft 62 lies in a plane adjacent and parallel to the lead screw and is rotated in any desired manner. The cam shaft and mechanism operated therefrom are so designed that one complete revolution of said shaft will produce one complete operation of the thread cutting mechanism, the magazine feeding mechanism and of the blank gripping mechanism. In the present showing of the machine the cam shaft is operated from a worm 64 provided on one end of the main drive shaft. Engaging worm 64 is a worm wheel 65 mounted on one end of a transverse shaft 66 which has its other end received in a change-gear box 67. Located above shaft 66 is a second transverse shaft 68 carrying thereon a worm 69 in mesh with a worm gear 70 secured to the adjacent end of camshaft 62. One end of shaft 68 is also received in the box 67. Adapted to be detachably mounted on the ends of shafts 66 and 68 within said box are gears 71 of the usual change gear type. It is desirous to provide a means such as described above for determining the relative rotation of shafts 62 and 37, such means making it possible to obtain the correct amount of travel of the threading dies when operating on different lengths of bolts having different lengths of threads.

The cam shaft 62 is provided with a second cam drum 72 similar in construction to drum 52 and actuating the mechanism carried by the die carrying sliding member 27. Means for actuating the mechanism of the magazine and the gripping jaw mechanism is also carried by the cam shaft 62, both of said means appearing in specified form hereafter.

The magazine.

Any suitable type of magazine may be employed within the purview of my invention. Preferably, however, the magazine consists of a V-shaped hopper open at the top and bottom and located above and in substantially vertical alignment with the thread cutting dies, the hopper being so arranged to contain stay-bolts in longitudinal relation to the threading dies that they may be delivered in proper position.

Inasmuch as the present invention is designed to automatically thread stay-bolts one by one by continuous operations, the magazine comprises means for intermittently feeding stay-bolts to a position between the thread cutting dies.

In the preferred embodiment of the invention illustrated herein, the magazine is formed of a V-shaped hopper 73 which is carried by a bracket or frame work 74 rigidly secured to the top of the boss 38 and to one or more of the brackets 63. The hopper comprises ends 75 between which are longitudinally received a number of stay-bolts, said ends being held on framework 74 by adjustable bolts 75$^a$ engaged in longitudinal T slots 75ᵇ in the framework 74 in the usual manner, which allows such ends 75 to be adjustable with respect to each other as is required to adapt the magazine for various lengths of bolts. The bottom of the hopper is provided with a restricted opening 76 through which the bolts are fed one by one. Slidably mounted in the facing sides of ends 75 are vertically reciprocable slide members 77 which when in their raised position have their lower ends terminating contiguous to the position of the lowermost bolt in the hopper. The bodies of members 77 are received in recesses or grooves 78 in the ends 75 so that they lie flush with the inner surfaces thereof and do not interfere with the movement of the bolts in the hopper. The lower ends of members 77 are divided, one-half 79ᵃ of which is pivotally secured to the other half 79 at 80 and the lower ends of halves 78 and 79 are provided with pairs of blank carrying jaws 81 which are adapted to receive the ends of one bolt at a time from the hopper. The pivoted portions 78 are normally held against portions 79 by springs 82. Means for allowing just one bolt at a time to be received in jaws 81 reside in a reciprocable pin or finger 83 mounted at the bottom of the hopper and extending across opening 76 into the path of the bolts. The slides 77, as will be presently described, are intermittently reciprocated to carry a bolt from the hopper to a position adjacent the axis of the thread cutting dies, and finger 83 is intermittently withdrawn from the path of the bolts to allow a fresh blank to be supplied to the jaws 81, said finger being held in the path of the bolts in the hopper during the movement of slides 77. Actuation of finger 83 is effected through a bell crank 84 having one end attached to the finger 83 and the other end attached to a spring pressed rod 85 which is operated by a cam lug 86 on the top of slide member 26. When the member 26 is approaching the end of its advance movement on the blank, at which time there is no blank held in the jaws of slides 77, the rod 85 rides inwardly on a stepped portion 87 of the cam lug 86 and retracts the finger 83 from the opening at the bottom of the hopper. Consequently a fresh blank drops down between the jaws 81 and is held thereby ready to be fed to the dies. Return movement of members 26 actuates rod 85 to restore the finger 83 in the path of the remaining blanks in the hopper.

The slide members 77 are reciprocated by arms 88 mounted on a rock shaft 89 which is mounted for rotation in the frame work 74 of the magazine. The outer ends of arms 88 are provided with slots 90 in which are received pins 91 carried by members 77 and extending through elongated slots in the hopper ends 75. Also mounted on rock shaft 89 is a bell crank lever, the ends 93 and 94 of which carry cam rollers 95 adapted to be engaged by cams 96 and 97 respectively. Cams 96 and 97 are adapted to extend along the opposite sides of a rotating disc 98 which is mounted on the cam shaft 62. As clearly seen in Figs. 11 and 12, cam 96 first engages its roller 95 to rock the arms 88 downwardly, thus lowering a blank from the magazine to operative position, after which operation continued rotation of disc 98 brings cam 97 in engagement with its roller on arm 94 to restore arms 88 and slide members 77 to their initial raised position. The timing of cams 96 and 97 is so that members 77 are actuated during the interval in which the thread cutting dies are retracted from the blanks, as has been stated.

In the present embodiment of my invention illustrated in Figs. 11 to 16, I have provided means for agitating the stay-bolt blanks contained in the magazine. Slidably mounted on the interior of one side of the V-shaped hopper, preferably the rear side thereof, is a slide or slides 99, upon which the bolts rest and which are provided with teeth or serrations 100 intended to agitate the bolts when slide 99 is moved. Means for reciprocating slide 99 comprises an arm 101 mounted on a second rock shaft 102 carried by the frame work 74 and having its end 103 engaging in a recess 104 in the upper end of slide 99. The shaft 102 is oscillated from an arm 105 mounted thereon and cams 106 and 107 provided on the end of cam drum 72. There may be one or more pairs of said cams arranged circumferentially on the end of said drum and it will be obvious that the movement imparted therefrom to the rock shaft 102 will cause the slide 99 to reciprocate within the hopper. Means for bodily raising slide 99 to supply additional agitation may consist of a supplemental slide member 108 received in a longitudinal recess 109 in the outside of slide 99. The inner end of member 108 is rounded and adapted to engage a complementary rounded portion 110 at the end of recess 109. Referring to Fig. 16, it will be seen that by moving the member 108 longitudinally of slide 99, said slide will be raised bodily. Member 108 is also actuated by arm 101 which engages in a recess 111 in the upper end of said member. Recess 104 is of greater length than recess 111, said difference providing for a longitudinal movement of member 108 with respect to slide 99.

*The blank receiving and gripping jaws.*

One of the most important features of this invention resides in the mechanism for receiving the stay-bolt blank and presenting the same to suitable thread cutting devices. As illustrated in the accompanying drawings, the blank receiving and holding device is in the form of jaws adapted to grip the blank presented thereto, as is performed by the magazine mechanism, then to position it in coaxial alignment with the threading dies.

In the embodiment shown in the accompanying drawings, which is illustrated more specifically in Figs. 17 and 18, the jaws are horizontally mounted one on each side of a blank which when brought together grip the blank between them. As has been previously mentioned, cold-rolled bolts and bolts of a straight character may be held in a pair of jaws which are rigidly mounted, and it is for the handling of such comparatively straight bolts that the present embodiment is provided. One of the jaws indicated by numeral 112 is rigidly secured upon the bed plate 1 preferably centrally of the machine and has its jaw or engaging face in coaxial alignment with the spindle shafts and cutting dies. The other of such jaws indicated at 113 is secured upon a transverse slide 114 which is mounted in suitable guideways in a boss 115 on the bed plate, and is movable toward and away from jaw 112 to grip a blank thereagainst.

In the actual operation of the machine, a stay-bolt blank is delivered by members 77 to a position horizontal with, but a slight distance forward of the jaw 112, and the clamping movement of the jaw 113 moves the bolt horizontally toward jaw 112 against the pivotal portion 78 of member 77 and the action of spring 82. This construction allows the return movement of members 77, the portion 78 expanding to clear the bolt and returning against portion 79 when member 77 is raised. The reciprocable action of slide 114 is effected by a toggle-joint connection, one leg 116 of which is connected to the slide and the other leg 117 of which is mounted on a rock shaft 118 rotatably carried in bosses or brackets 119 at the front of the bed plate. An arm 120 mounted on shaft 118 is actuated to oscillate said shaft by means of a reciprocating bar or rod 121 extending transversely through the bed plate in suitable apertures provided therein. Means for intermittently reciprocating rod 121 may consist of a bell crank plate 122 mounted on a rock shaft 123 which is journaled in a lateral extension 124 on one of the brackets 63, one end of said bell crank being secured to the end of rod 121 and the other end being provided with a cam roller 125; and of a suitable cam 126 which is carried on one end of the revolving cam drum 52 and so timed as to actuate the rod 121 and jaw 113 at the desired time. The end or bell crank 122 which is secured to rod 121 may be provided with an adjustable connection 127 adapted to regulate the travel of jaw 113. Cam 126 is designed to actuate the mechanism for closing jaw 113 once during the revolution of the cam shaft and drum 52. I provide means independent of cam 126 for breaking the toggle-joint and retracting the jaw 113 which means may consist of a rotating arm 128 mounted on the cam shaft 62 and provided at its end with a roller 129 adapted to engage a cam surface 130 on the bell crank plate 122. As will be apparent from an inspection of Figs. 17 and 18 first the arm 128 operates to open the jaws, at which time the cut blank is ejected and a fresh one brought therebetween, and then cam 126 operates to straighten the toggle joint and lock the jaws onto the blank.

After the blanks have been acted on by the thread cutting dies, and the jaws opened, they will drop therefrom because of their own weight. As indicated at 131 the bed plate is suitably apertured beneath the thread cutting position of the bolts through which aperture the bolts may drop into the pan 3.

Because of the fact that most bolts of the stay-bolt type are manufactured by a hot-rolled process, and consequent of the more or less distorted shape of such bolts, it has been necessary to devise means which will effectively grip and position hot-rolled stay-bolts or the like with their ends in coaxial alignment with a pair of thread cutting dies. To the accomplishment of such end I have devised the novel gripping jaw mechanism illustrated in detail in Figs. 19 to 24 of the drawings which mechanism is to be considered as the preferred form of blank gripping mechanism in connection with the present novel machine.

Mounted in the guideways provided in the boss 115 is a slide 132 adapted to be reciprocated in similar manner to the slide 114. In this specific embodiment of the invention both halves of the blank gripping jaws are carried by slide 132, the lower half 133 being secured to the top of said slide and the upper half 134 being pivotally secured to the lower half on a trunnion pin 135. Means for controlling the opening and closing of the jaws which are located at the forward end of members 133 and 134 consist of a toggle-joint having its arms 136 and 137 attached to the adjacent ends of said members. The toggle is controlled by a link 138 and an arm 139 carried by the rock shaft 118. Rock shaft 118 carries at one end an arm 140 provided with an elongated slot 141 in which is engaged a pin 142 carried by an oscillating plate 143 which is pivotally mounted on the side of bracket 119 on a stub shaft 144. In this instance the reciprocating rod 121 is attached to and adapted to control oscillation of plate 143 which oscillatory movement effects the making and breaking of said toggle-joint. To insure the correct travel of slide 132 relatively with the making and breaking of the toggle-joint, I provide a cam plate 145 which is secured in any desired manner upon the slide 132. Fixedly secured to the rock shaft 118 is a cam member 146 adapted to engage the cam plate 145 and move the slide and its blank receiving jaws the desired distance forward. It will be noted from an inspection of Figs. 19 and 20 that the cam 146 and link 138 are so timed that the jaws are brought to their forward position before link 138 operates to close the toggle. Likewise is the slide and jaws held in their said position by the engagement of cam 146 with plate 145 until after the toggle has been broken. The pivot of arm 136 in the jaw 134 may be yieldably held therein by a spring 147 which prevents injury to the blank receiving jaws should a bolt of larger diameter be received than one for which the jaws are designed.

The upper and lower members 133 and 134 of the jaws and their operating mechanism are so designed to allow self-adjustment thereof after they have been gripped upon a blank. The adjustment of said members is necessary on account of the distortion and variation found in hot-rolled bolts. Slot 141 is enlarged at its lower end at 141ª in which pin 142 may have a certain amount of loose play, i. e. the arm 140 may rock back and forth to move slide 132 and the clamping jaws without affecting the movement of pin 142 and the rod 121.

Located adjacent the facing sides of the thread cutting dies are centering devices which are adapted to engage the ends of a blank and position them coaxially with the dies. Each of said devices may comprise a laterally projecting finger 148 mounted on a bar 149 which is carried in the die carrying head 24. Referring especially to Fig. 22, it will be seen that the fingers 148 project across the face of the die to engage and center the blank. When the dies advance on the blank the fingers 148 travel with them and do not interfere with the threading operation. Bars 149 are yieldingly mounted in the heads 24 and 25, which construction permits the fingers to be compressed as is necessary in the threading of short stay-bolts.

Means for insuring the ejection of the bolts from the gripping jaws is shown in a pair of plates 151 secured to the boss 115, one on each side of the lower jaw member 133 and projecting into the path of the bolts. After the jaws have been separated if the bolt does not fall therefrom because of its own weight, the backward movement of said jaws will engage the bolt with plates 151 which will free the bolt therefrom.

In Figs. 23 and 24 is illustrated a jaw mechanism which will permit considerable self-adjustment of the blank engaging portions 152 and 153 of members 133 and 134 respectively. The portion 152 is provided with a round base 154 which is received in a correspondingly rounded recess 155 in the member 133, and is keyed therein by a key 156 which permits of sidewise adjustment of portion 152. The portion 153 which is arcuate in shape and has a rounded base 157 fitting in a complementary rounded recess 158 in the member 134 is angularly adjustable in said member. A screw 159 working in a slot 160 tends to hold the portion 153 against the member 134 but allows it to be rocked circumferentially thereof. A spring pressed plunger 161 carried by one of the jaw members and operating between portions 153 and 154 may be used in connection with the novel construction described above. In use, when the jaws are brought forward by the slide 132 in their separated condition, the plunger 161 first engages the blank and pushes it from the members 77 against the fingers 148 in which position the blank is held until the jaws are closed, the portions 152 and 153 automatically assuming the correct grip on the blank due to the self-adjusting propensity of said blank engaging portions.

Figure 25:
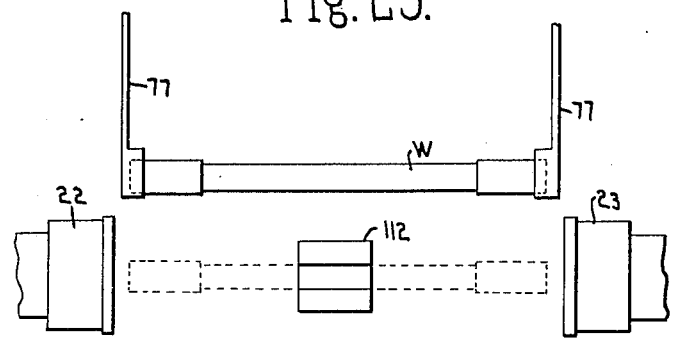
Figure 26:
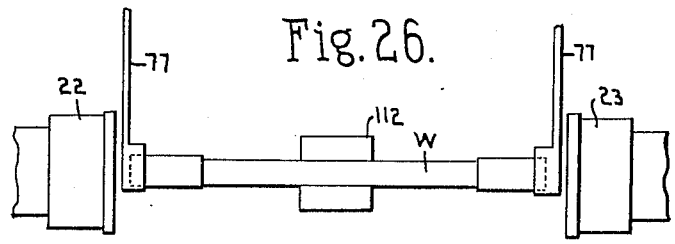
Figure 27:
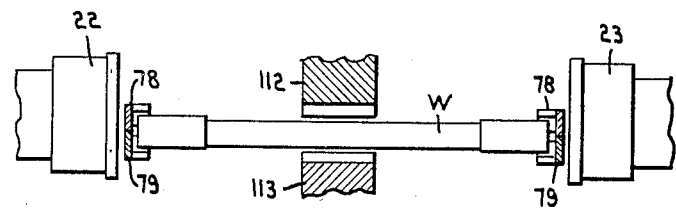
Figure 28:
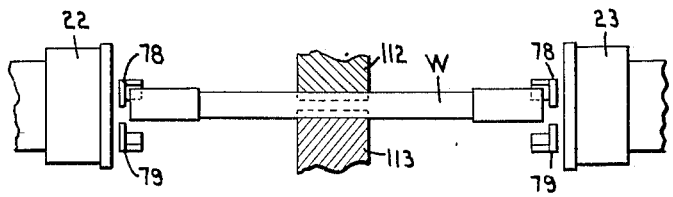
Figure 29:
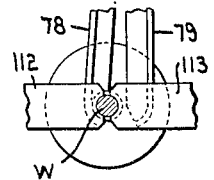
Figure 30:
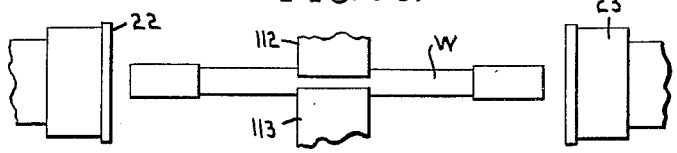
Figure 31:
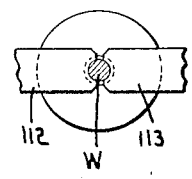
Figure 32:
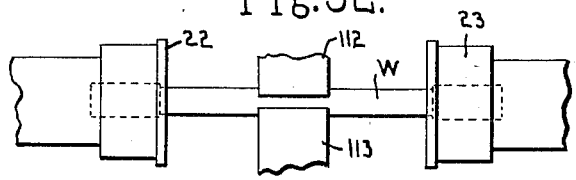
Figure 33:
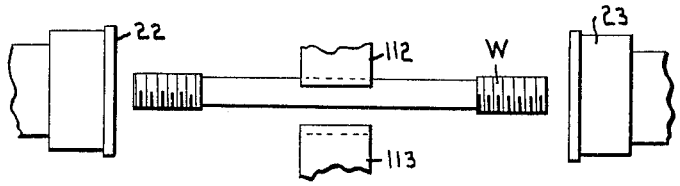
Figure 34:
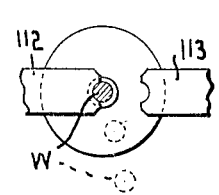

The operation of the present machine is very simple and accomplishes its functions automatically and continuously. To start and stop the machine the hand lever 9 is moved to engage or disengage the driving pulley 7 with the main drive shaft 4, from which is actuated all of the several operative elements of the machine. The various steps in the operation of the machine in their relative sequence is clearly shown in the drawings in Figs. 25 to 34. First a blank is fed by the magazine to the reciprocating members 77 through the magazine, as has been described, which convey it to a position between the gripping jaws, as indicated in Figs. 25, 26 and 27, which are then operated to grip the blank and position it in coaxial alignment with the revolving thread cutting dies 22 and 23, seen in Figs. 28, 29, 30 and 31. The members 77 are then withdrawn and the dies advanced (see Fig. 32) upon the blank to cut threads on each end thereof simultaneously. After the completion of the thread cutting operation, the dies are withdrawn from the blank and the gripping jaws opened, (see Figs. 33 and 34), in which position the jaws are ready to receive a fresh blank which is delivered from the magazine in a similar manner to that described above and the subsequent operations repeated.

It will be obvious from the foregoing description and accompanying drawings that I have accomplished the objects primarily stated and that I have provided a novel machine which is simple in operation and which will automatically and continuously operate to thread both ends of stay-bolt blanks as they are fed from the magazine of the machine. It is to be understood that the specific form of magazine, of thread cutting die, and of other operative elements specifically shown and described herein are not restrictive and that the invention contemplates many variations in the construction of such elements as may be made within the scope of the invention as defined by the following claims.

I therefore particularly point out and distinctly claim as my invention:—

1. In a machine of the character described, the combination of means for threading both ends of a blank simultaneously, automatically operated means for presenting blanks one by one between said threading means, means in substantially coaxial alignment for positioning said blank with its ends coaxially of said threading means, means for bodily moving and means for holding the presented and positioned blank during the threading operation.

2. In a machine of the character described, the combination of a pair of opposed continuously rotating thread cutting dies, automatically operated means for simultaneously moving the dies toward and away from each other, said dies having their threading elements arranged in lead with each other, means for maintaining the lead of said dies during the threading operation, continuously operated means for presenting blanks one by one between said dies, and intermittently actuated means for gripping the presented blank intermediate its ends during the threading operation.

3. In a machine of the character described, the combination of a bed plate, a drive shaft journaled therein, opposed rotating dies reciprocably mounted on said bed plate, a lead screw actuated from said shaft, means for intermittently connecting the screw with each of said dies adapted to cause them to simultaneously approach one another and having the threading elements thereof in lead with each other, and means operated from said drive shaft for retracting the dies.

4. In a machine of the character described, the combination of a bed plate, a drive shaft journaled therein, opposed rotating dies reciprocably mounted on said bed plate, a lead screw actuated from said shaft, means for intermittently connecting the screw with said dies adapted to cause them to approach one another, means operated from said drive for retracting the dies, and means for presenting a blank between said dies.

5. In a machine of the character described, the combination of a bed plate, a drive shaft journaled therein, opposed rotating dies reciprocably mounted on said bed plate, a lead screw actuated from said shaft, means for intermittently connecting the screw with each of said dies adapted to cause them to approach one another, means operated from said drive shaft for retracting the dies, and means operable with said dies for coaxially positioning the ends of a blank therewith.

6. In a machine of the character described, the combination of a bed plate, a drive shaft journaled therein, opposed thread cutting dies reciprocably mounted on said bed plate, a lead screw actuated from said shaft, means for intermittently connecting the lead screw with the dies to cause them to approach one another, means operated from said shaft for retracting said dies, means for intermittently feeding blanks between said dies, and means for gripping the blanks intermediate their ends during the approach of said dies.

7. In a machine of the character described, the combination of means for threading both ends of a stay-bolt blank simultaneously, blank receiving means adapted to grip a blank intermediate its ends, and means for positioning said ends coaxially with said thread cutting means, said last named means being carried by said threading means.

8. In a machine of the character described, the combination of means for threading both ends of a stay-bolt blank simultaneously, automatically operated means for presenting a blank to said threading means, and blank receiving means adapted to grip the presented blank and position its ends coaxially with said threading means.

9. In a machine of the character described, the combination of opposed rotating dies, means for presenting a blank between said dies in longitudinal alignment therewith, and shiftable gripping jaws adapted to move said blank bodily to position it coaxially between said dies and to grip it rigidly in such position during the threading thereof.

10. In a machine of the character described, the combination of a bed plate, coaxially opposed rotating dies reciprocably mounted thereon, a slide carried by said bed plate, blank gripping jaws mounted on said slide, and means adapted to move the slide and jaws transversely of said dies and to open and close said jaws.

11. In a machine of the character described, the combination of reciprocally mounted opposed rotating dies, a slide mounted between said dies, means for intermittently reciprocating said slide, and a pair of gripping jaws carried by the slide, said means being also adapted to open and close said jaws.

12. In a machine of the character described, the combination of opposed rotating dies adapted to receive a blank therebetween, a slide mounted transversely of said dies, jaws carried by said slide, means for moving said slide to engage the jaws with the blank intermediate its ends and including means for closing said jaws onto the blank, said jaws being adapted to bodily move said blank to coaxial alignment with said dies upon movement of said slide.

13. In a machine of the character described, the combination of a reciprocably mounted slide, a pair of jaws carried thereby, means for advancing said slide while maintaining the jaws in open condition, and means cooperating with said first named means for closing said jaws when the slide has been advanced, said slide advancing means being provided with loose play at the end of its forward stroke.

14. In a machine of the character described, the combination of opposed rotating dies, means for reciprocating said dies toward and from each other, means for receiving a stay-bolt blank comprising a pair of gripping jaws adapted to intermittently grip a blank, and means for bodily moving said jaws, said jaws being provided with means permitting longitudinal angular adjustment of said stay-bolt blank without releasing said gripping jaws.

15. In a machine of the character described, the combination of opposed rotating dies reciprocably mounted with respect to each other, blank centering devices mounted with said dies and located adjacent their facing sides, and gripping jaws operable intermediate said dies, said gripping jaws being adapted to cooperate with said centering devices for coaxially positioning said blank.

16. In a machine of the character described, the combination of opposed rotating dies, centering devices mounted adjacent the facing sides of said dies, and jaws mounted between said centering devices adapted to receive a stay-bolt blank therein and to position it with its ends in said centering devices.

17. In a machine of the character described, the combination of a pair of opposed rotating threading dies, means for actuating said dies to approach one another, subsequently acting means for maintaining the threading elements of said dies in lead and adapted to continue such approach, and means operating in timed relation with said die actuating means for intermittently presenting a blank between said dies.

18. In a machine of the character described, the combination of opposed rotating threading dies, a slide mounted intermediate of said dies, a pair of jaws mounted on said slide, one of said jaws being pivotally mounted, means for moving said slide transversely of said dies and means for closing said jaws, said slide actuating means operating in advance of said jaw closing means.

19. In a machine of the character described, the combination of opposed rotating dies, a slide mounted to move transversely of said dies, a pair of gripping jaws mounted on said slide, one of said jaws being pivotally mounted, and means for moving said slide to bring the gripping portion of said jaws in co-axial alignment with said dies, whereupon said means is further actuated to close said jaws.

20. In a machine of the character described, the combination of opposed rotating dies adapted to receive a blank therebetween, said dies being adapted to move toward and away from each other in unison, centering devices mounted with said dies and adjacent their facing sides, a pair of gripping jaws mounted intermediate of said dies, means for reciprocating said jaws to and from co-axial alignment with said dies, said jaws being adapted to move the blank against said centering devices, and means for closing the jaws upon the centered blank.

21. In a machine of the character described, the combination of opposed rotating dies adapted to receive a blank therebetween, said dies being adapted to move toward and away from each other in unison, centering devices mounted with said dies and adjacent their facing sides, a pair of gripping jaws mounted intermediate of said dies, means for reciprocating said jaws to and from coaxial alignment with said dies, said jaws being adapted to move the blank against said centering devices, means for closing the jaws upon the centered blank, and a spring member mounted between said jaws and said closing means.

Signed by me this 5th day of February, 1923.

JOHN P. BROPHY.